United States Patent
Wildstone et al.

(10) Patent No.: US 9,419,394 B2
(45) Date of Patent: *Aug. 16, 2016

(54) BUSBAR CONNECTION ASSEMBLY

(71) Applicant: Amazon Technologies, Inc., Seattle, WA (US)

(72) Inventors: Kelsey Michelle Wildstone, Seattle, WA (US); Rick Alan Vogt, Lake Stevens, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/843,657

(22) Filed: Sep. 2, 2015

(65) Prior Publication Data

US 2015/0380885 A1    Dec. 31, 2015

Related U.S. Application Data

(63) Continuation of application No. 14/568,963, filed on Dec. 12, 2014, now Pat. No. 9,147,948, which is a continuation of application No. 13/673,060, filed on Nov. 9, 2012, now Pat. No. 8,911,248.

(51) Int. Cl.
  *H01R 4/42*       (2006.01)
  *H01R 25/14*      (2006.01)
  *H02J 9/04*       (2006.01)
  *H02J 9/06*       (2006.01)
  *H01R 4/60*       (2006.01)
  *H01R 43/20*      (2006.01)

(52) U.S. Cl.
  CPC ............... *H01R 25/14* (2013.01); *H01R 4/60* (2013.01); *H01R 43/20* (2013.01); *H02J 9/04* (2013.01); *H02J 9/06* (2013.01); *H01R 4/42* (2013.01); *H01R 25/142* (2013.01); *H02J 2009/068* (2013.01); *Y10T 29/49208* (2015.01); *Y10T 307/615* (2015.04); *Y10T 307/62* (2015.04)

(58) Field of Classification Search
  CPC ............ H02G 5/007; H02G 5/00; H02G 5/08; H02G 5/06; H01R 4/363; H01R 4/36; H01R 4/34; H01R 4/64; H02J 9/062; H02J 9/061; H02J 4/42; H02J 4/38
  See application file for complete search history.

(56) References Cited

U.S. PATENT DOCUMENTS

| | | |
|---|---|---|
| 3,180,924 A | 4/1965 | Rowe |
| 3,189,680 A | 6/1965 | Stanback |
| 3,710,301 A | 1/1973 | Weimer |
| 3,909,098 A | 9/1975 | Reed et al. |
| 5,011,421 A | 4/1991 | Duke et al. |
| 5,805,414 A | 9/1998 | Feldhaeusser |
| 6,435,888 B1 | 8/2002 | Reed, Jr. |
| 6,832,168 B2 | 12/2004 | Graves et al. |
| 7,358,439 B2 | 4/2008 | Rasmussen et al. |
| 7,633,181 B2 | 12/2009 | Gross et al. |
| 8,264,840 B2 | 9/2012 | Bergthold et al. |
| 8,540,526 B2 | 9/2013 | Mooney et al. |
| 8,668,516 B2 | 3/2014 | Lee |
| 8,828,585 B2 | 9/2014 | Ha et al. |
| 2012/0268865 A1* | 10/2012 | Strebel Marzano ... H01H 33/06 361/624 |
| 2013/0171850 A1 | 7/2013 | Mooney et al. |
| 2013/0293017 A1 | 11/2013 | Englert et al. |
| 2014/0349502 A1 | 11/2014 | Meis |
| 2015/0035496 A1* | 2/2015 | Kikuchi ............ H02G 5/00 320/137 |

\* cited by examiner

*Primary Examiner* — Gary Paumen

(74) *Attorney, Agent, or Firm* — Thomas | Horstemeyer, LLP

(57) ABSTRACT

According to various embodiments, a datacenter busbar conductor may be inserted into an opening that is formed between a first conductor and a second conductor of a busbar connection assembly. The busbar connection assembly can be restricted from being removed from the opening that is formed between the first conductor and the second conductor. The busbar connection assembly can be electrically coupled to an electrical power source.

20 Claims, 7 Drawing Sheets

BUSBAR CONNECTION ASSEMBLY

CROSS-REFERENCE TO RELATED APPLICATIONS

This application is a continuation of and claims priority to U.S. patent application Ser. No. 14/568,963, titled "BUSBAR CONNECTION ASSEMBLY" and filed on Dec. 12, 2014, which is a continuation of and claims priority to U.S. patent application Ser. No. 13/673,060, titled "BUSBAR CONNECTION ASSEMBLY," filed on Nov. 9, 2012. Each of these applications is incorporated by reference herein in its entirety.

BACKGROUND

A datacenter may house several computing devices, such as server computers, storage devices, and networking devices. In order to distribute electrical power for the computing devices, a power bus may be located within the datacenter.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure is directed towards a busbar connection assembly that may be used, for example, in a datacenter or in other environments where power distribution from a power bus is desired. The busbar connection assembly may facilitate maintenance, replacement, and/or repair of a device in a datacenter without having to power down computing devices that receive power via the device being maintained, repaired, and/or replace.

As a non-limiting example, an automatic transfer switch that routes power to computing devices in a datacenter may be brought off-line without having to power down the computing devices. To this end, the automatic transfer switch may be disconnected from utility and backup power. Additionally, connections between the automatic transfer switch and a power distribution switchboard that is fed by the automatic transfer switch may be disconnected. A battery supply may then temporarily provide power to the computing devices while the automatic transfer switch is disconnected.

With the automatic transfer switch disconnected from the power sources, a busbar connection assembly may be attached to a power bus within the switchboard, and the busbar connection assembly may then be connected to a backup power source, such as a generator. Thus, the backup power source may provide power to the computing devices through the busbar connection assembly while the automatic transfer switch is off-line.

The busbar connection assembly may comprise multiple conductive plates that are substantially parallel with respect to each other, and slots may be formed between the conductive plates. To attach the busbar connection assembly to the power bus, the conductive plates of the busbar connection assembly may insert between busbar plates for the power bus, while the busbar plates for the power bus insert into the slots in the busbar connection assembly.

When the automatic transfer switch is repaired or replaced and ready to be brought back online, the backup power source may be disconnected from the busbar connection assembly, and the battery supply may temporarily provide power to the computing devices. The automatic transfer switch may then be reconnected to the switchboard, and the utility and backup power may be reconnected to the automatic transfer switch. Thereafter, the automatic transfer switch routes the electrical power to the computing devices. Thus, the automatic transfer switch may be maintained, repaired, or replaced without having to power down the computing devices. In the following discussion, a general description of the system and its components is provided, followed by a discussion of the operation of the same.

Figure 1A:
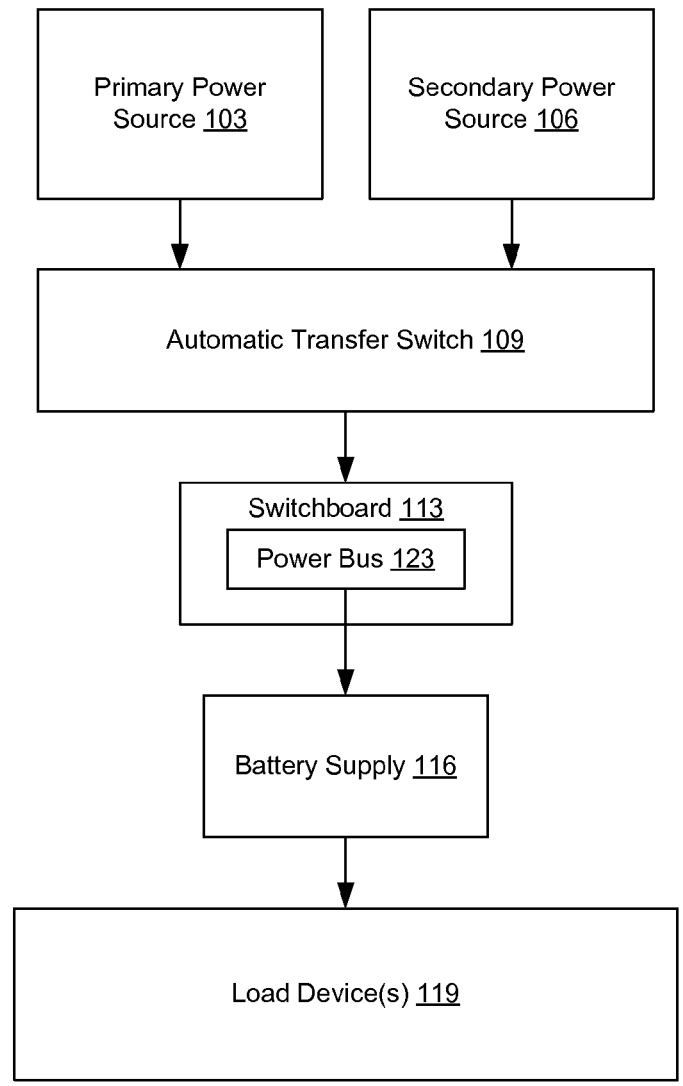
FIGS. 1A-1B are drawings of examples of a portion of a datacenter according to various embodiments of the present disclosure.

With reference to FIG. 1A, shown is a drawing of an example of a portion of a datacenter 100 according to various embodiments of the present disclosure. The datacenter 100 may, for example, provide data processing and data storage capabilities for various uses. For electrical power, the datacenter 100 may include, for example, a primary power source 103 and a secondary power source 106 in electrical communication with an automatic transfer switch 109. The automatic transfer switch 109 may be in further electrical communication with a switchboard 113, which is further coupled to a battery supply 116. One or more load devices 119 may be electrically coupled to the battery supply 116.

The primary power source 103 may be, for example, a public utility that provides electrical power. The secondary power source 106 may be a power source that is used in the event of an interruption in the primary power source 103. As such, the secondary power source 106 may be embodied in the form of one or more electric generators powered by fuel or renewable sources, for example.

The automatic transfer switch 109 routes electrical power from the primary power source 103 or the secondary power source 106 to the switchboard 113 and/or possibly other devices. If the primary power source 103 is online and functioning properly, the automatic transfer switch 109 may couple the switchboard 113 to the primary power source 103. In the event that the primary power source 103 goes off-line or is not functioning properly, the automatic transfer switch 109 may electrically couple the switchboard 113 to the secondary power source 106. Thus, the secondary power source 106 may serve as a backup power supply for the datacenter 100 when there are issues with the primary power source 103.

The switchboard 113 may function as a power distribution unit for various components in the datacenter 100. To this end, the switchboard 113 may include one or more power buses 123 that provide power and facilitate electrical coupling between various components. According to various embodiments, a power bus 123 may include multiple busbar plates that are substantially parallel with respect to each other. The power bus 123 may comprise, for example, copper busbar plates to facilitate conducting electrical current. Example configurations of busbar plates for a power bus 123 are discussed in further detail below.

The battery supply 116 and potentially other components may be electrically coupled to the switchboard 113 via the power bus 123. The battery supply 116 may provide temporary power to devices in the datacenter 100. To this end, the battery supply 116 may be embodied in the form of an uninterruptible power supply (UPS) or other type of backup power device.

One or more load devices 119 may be electrically coupled to the battery supply 116. According to various embodiments, the load devices 119 may include computing devices, such as server computers, storage devices, network switches, or any other type of device used in network communications, data processing, and/or data storage. The load devices 119 may use the battery supply 116 as a temporary backup power source in the event that the primary power source 103 and/or the secondary power source 106 are not providing power. Thus, the load devices 119 may be capable of functioning despite temporarily losing power from the primary power source 103 and/or the secondary power source 106. In some embodiments, the battery supply 116 and one or more of the load devices 119 may be in parallel connection, instead of being in series connection as shown in FIG. 1A.

Next, a general description of the operation of the various components of the datacenter 100 is provided. To begin, it is assumed that the primary power source 103 is online and providing electrical power, that the secondary power source 106 is prepared to provide power in the event that the primary power source 103 goes off-line, and that the battery supply 116 is charged to the extent that it can temporarily supply power to the load devices 119.

When the primary power source 103 is online and providing power for the datacenter 100, the automatic transfer switch 109 electrically couples the primary power source 103 to the switchboard 113. As such, the power bus 123 is in electrical connection with the primary power source 103, and the battery supply 116 and the load devices 119 are powered using the primary power source 103.

In the event that the primary power source 103 malfunctions or goes off-line, the battery supply 116 maintains a temporary power supply for the load devices 119 until power from the secondary power source 106 is prepared to be provided to the load devices 119. While the load devices 119 are being powered by the battery supply 116, the automatic transfer switch 109 removes the electrical coupling from the primary power source 103 and provides electrical coupling between the switchboard 113 and the secondary power source 106. Thus, the power bus 123 becomes electrically coupled to the secondary power source 106. In turn, the electrical power from the secondary power source 106 is provided to the battery supply 116 and the load devices 119.

Upon the primary power source 103 going back online, the automatic transfer switch 109 removes the electrical coupling between the switchboard 113 and the secondary power source 106, and then provides electrical connection between the switchboard 113 and the primary power source 103. During the switch, the battery supply 116 provides power to the load devices 119. When the switch from the secondary power source 106 to the primary power source 103 has completed, the primary power source 103 is connected via the automatic transfer switch 109 to the switchboard 113 and thus the power bus 123. As such, the battery supply 116 and the load devices 119 are then powered by the primary power source 103.

As can be appreciated by a person having ordinary skill in the art, various devices in the datacenter 100 may require maintenance, repair, and/or replacement from time to time. In order to accomplish this maintenance, repair, and/or replacement, some of these devices may need to be removed from their respective power sources for safety or other considerations. As a non-limiting example, the automatic transfer switch 109 may experience a failure that requires disconnecting the primary power source 103 and the secondary power source 106 in order to accomplish the replacement and/or repair of the automatic transfer switch 109. With the primary power source 103 and the secondary power source 106 disconnected from the automatic transfer switch 109, the battery supply 116 may supply a backup power to the load devices 119. However, because the battery supply 116 has a limited storage capacity, the time for which the battery supply 116 is capable of powering the load devices 119 is limited. It may be the case that the time it takes to repair or replace the automatic transfer switch 109 exceeds the time for which the battery supply 116 is capable of powering the load devices 119.

Figure 1B:
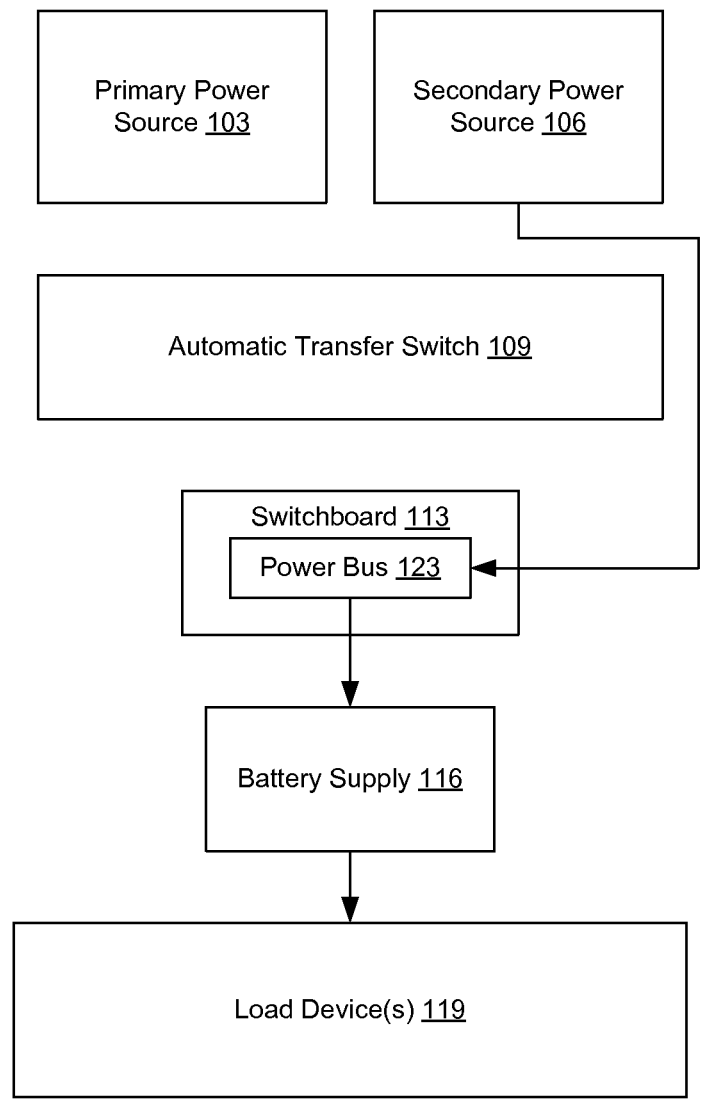

In accordance with the present disclosure, a backup power source, such as the secondary power source 106, may be temporarily coupled directly to the power bus 123 to provide power for the load devices 119, as will now be described. Turning to FIG. 1B, shown is the datacenter 100 after the power connections between the automatic transfer switch 109 and other components in the datacenter 100 have been removed. In addition, the secondary power source 106 has been routed to the power bus 123 in the switchboard 113. A busbar connection assembly 200 (FIGS. 2A-2B) may be used, for example, to electrically couple the secondary power source 106 to the power bus 123. It is understood that in alternative embodiments, a different type of backup power source, such as a roll-up generator or other type of power source, may be connected directly to the power bus 123, instead of the secondary power source 106.

As shown, the automatic transfer switch 109 is isolated from the primary power source 103, the secondary power source 106, and the power bus 123 for the datacenter 100. After the automatic transfer switch 109 is disconnected from the primary power source 103 and the secondary power source 106, and before the secondary power source 106 is connected directly to the power bus 123, the load devices 119 may be temporarily powered using the battery supply 116. Upon the secondary power source 106 being coupled directly to the power bus 123, the load devices 119 may be powered by the secondary power source 106, and the battery supply 116 may recharge. As such, the load devices 119 may continue to be powered by the secondary power source 106 and/or the battery supply 116 while the automatic transfer switch 109 is disconnected from the system.

When the automatic transfer switch 109 is repaired or replaced and ready to be powered by the primary power source 103 and/or the secondary power source 106, the direct connection from the secondary power source 106 and the power bus 123 may be removed. In embodiments where a busbar connection assembly 200 is used, the busbar connection assembly 200 may remain connected to the power bus 123, and a cable between the busbar connection assembly 200 and the secondary power source 106 may be disconnected. In such a case, the busbar connection assembly 200 may remain coupled to the power bus 123 indefinitely.

Upon the secondary power source 106 being disconnected from the power bus 123, the battery supply 116 may provide temporary power for the load devices 119. While the battery supply 116 is powering the load devices 119, the primary power source 103 and the secondary power source 106 may be reconnected to the automatic transfer switch 109, and the automatic transfer switch 109 may be reconnected to the power bus 123 in the switchboard 113. Thus, the automatic transfer switch 109 may be removed from power and repaired or replaced without the datacenter 100 losing the functionality of the load devices 119.

Figure 2A:
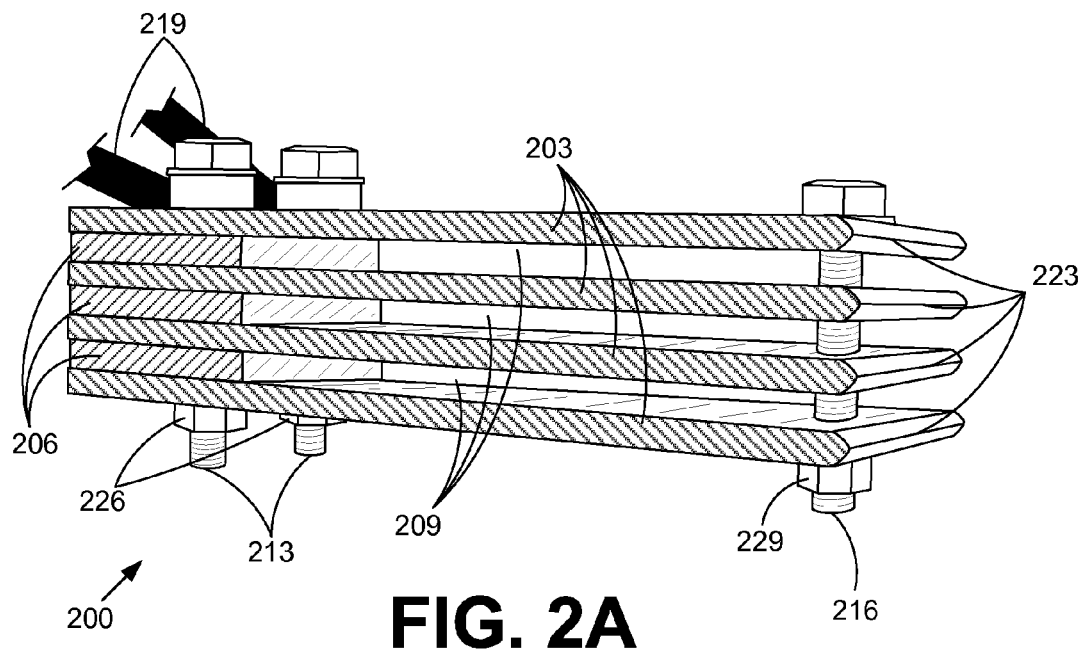
FIGS. 2A-2B are drawings of an example of a busbar connection assembly for use in the datacenter of FIGS. 1A-1B according to various embodiments of the present disclosure.
Figure 2B:
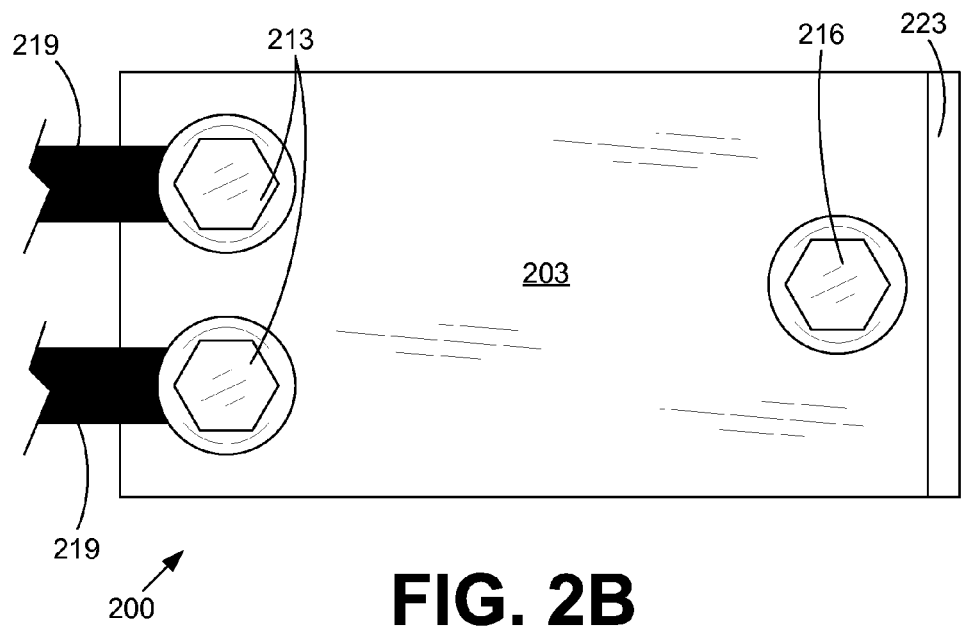

Turning now to FIGS. 2A-2B, shown are drawings of an example of a busbar connection assembly 200 that may be used in the datacenter 100 (FIG. 1) according to various embodiments of the present disclosure. More specifically, the busbar connection assembly 200 may serve, for example, as an electrical coupling between the power bus 123 (FIGS. 1A-1B) and the secondary power source 106 (FIGS. 1A-1B) or between any other devices. FIG. 2A shows a perspective view of the busbar connection assembly 200, and FIG. 2B shows a top view of the busbar connection assembly 200 according to various embodiments.

The busbar connection assembly 200 may comprise multiple conductive plates 203, multiple spacers 206, multiple slots 209, one or more first fasteners 213, one or more second fasteners 216, one or more power cables 219, and potentially other features and/or components. The conductive plates 203, the spacers 206, the power cables 219, the first fasteners 213, and/or the second fastener 216 may comprise, for example, copper or any other electrically conductive material.

As shown, the conductive plates 203 may be substantially parallel with respect to each other. Similarly, the spacers 206 may be substantially parallel with respect to each other and with respect to the conductive plates 203. Each spacer 206 may be located between a pair of the conductive plates 203. Further, each of the slots 209 may be located between a pair the conductive plates 203, and each of the spacers 206 may be located at an end of each of the slots 209.

Each of the slots 209 may be configured to provide space for one or more busbar plates of the power bus 123 (FIG. 1), and each of the conductive plates 203 may be configured to insert between a pair of busbar plates of the power bus 123. Additionally, one or more of the conductive plates 203 may include a tapered edge 223 that may facilitate insertion of the conductive plate 203 between the busbar plates of the power bus 123. The tapered edge 223 may also facilitate the busbar plates being inserted in the slots 209 between the conductive plates 203.

The one or more first fasteners 213 may insert through the conductive plates 203 and the spacers 206. The first fasteners 213, for example, may be threaded into nuts 226 and tightened to maintain the conductive plates 203 and the spacers 206 being in alignment and close proximity as shown in FIGS. 2A-2B. According to various embodiments, conductive or non-conductive epoxies, glues, or other materials may be used to maintain the conductive plates 203 being in close proximity to the spacers 206.

The one or more power cables 219 may be used to electrically connect the conductive plates 203 and/or the spacers 206 to a power source, such as the secondary power source 106 (FIGS. 1A-1B), or another component. Camlocks, "quick connectors," pigtail connectors, or any other type of component may be used to connect the power cables 219 to the first fasteners 213 or any other conductive element of the busbar connection assembly 200. Although the present example shows a pair of power cables 219 connected to the first fasteners 213, fewer or more power cables 219 may be used according to various embodiments. For example, the quantity of the power cables 219 used may be based at least in part on the expected amount of current to flow through the busbar connection assembly 200.

The second fastener 216 may insert through the conductive plates 203 and screw into a nut 229 or another type of component. By tightening the second fastener 216 and the nut 229, one or more of the conductive plates 203 clamp on and press against one or more of the busbar plates of the power bus 123. In alternative embodiments, a clamp, such as a C-clamp, or other type of apparatus may be used to clamp one or more of the conductive plates 203 against one or more of the busbars for the power bus 123. The conductive plates 203 may clamp on one or more of the busbar plates by, for example, the conductive plates 203 flexing or pivoting about the spacers 206.

In the embodiment shown, the busbar connection assembly 200 is configured so that when the busbar connection assembly 200 is attached to the power bus 123, the busbar plates are located in the slots 209 between the second fastener 216 and the spacers 206. However, in alternative embodiments, the busbar connection assembly 200 may be configured to so that when the busbar connection assembly 200 is attached to the power bus 123, the second fastener 216 is located between the busbar plates and the spacers 206.

Although the present embodiment shows the spacers 206 being separate components from the conductive plates 203, in alternative embodiments one or more of these components may be unitary. For instance, a block of copper or another material may be milled in order to form the slots 209, the conductive plates 203, the connectors, and/or other features of the busbar connection assembly 200.

Figure 3:
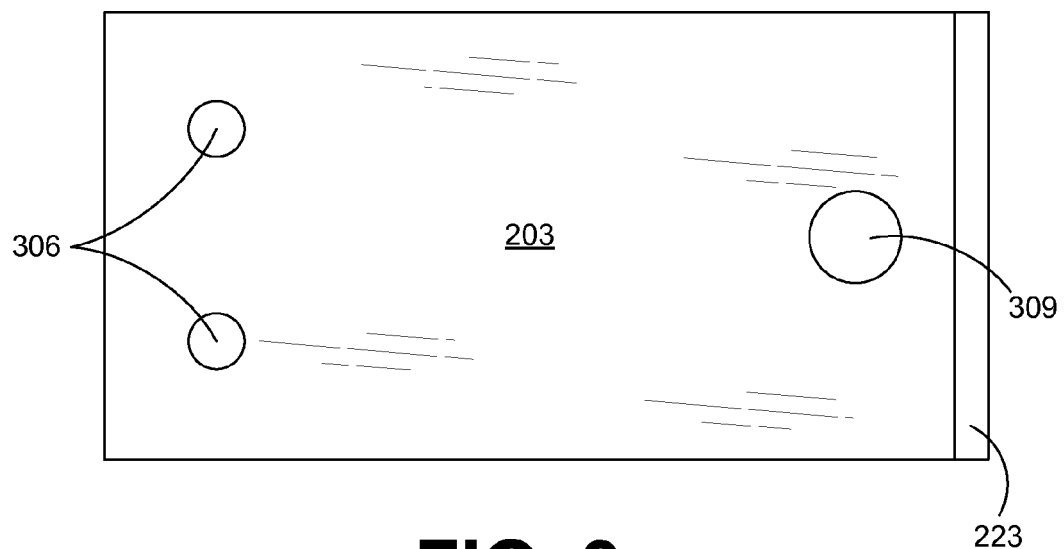
FIG. 3 is a drawing of an example of a conductive plate of the busbar connection assembly of FIGS. 2A-2B according to various embodiments of the present disclosure.

Turning now to FIG. 3, shown is an example of one of the conductive plates 203 in the busbar connection assembly 200 (FIGS. 2A-2B) according to various embodiments of the present disclosure. The conductive plate 203 may be, for example, rectangular or any other shape and may comprise copper or another type of material that conducts electricity. In some embodiments, the conductive plate 203 may have a tapered edge 223 that may facilitate insertion of the conductive plate 203 between busbar plates of the power bus 123 (FIGS. 1A-1B).

Additionally, the conductive plate 203 may include one or more first holes 306 through which the first fasteners 213 (FIGS. 2A-2B) insert and one or more second holes 309 through which the one or more second fasteners 216 (FIGS. 2A-2B) insert. Because it may be difficult for the second fastener 216 to access the second hole 309 when the busbar connection assembly 200 is attached to the power bus 123, the second hole 309 may be larger than the first holes 306 to facilitate the second fastener 216 being inserted into the second hole 309. A washer or an enlarged head on the second fastener 216, for example, may prevent the second fastener 216 from falling through the second hole 309 of the busbar connection assembly 200.

Figure 4:
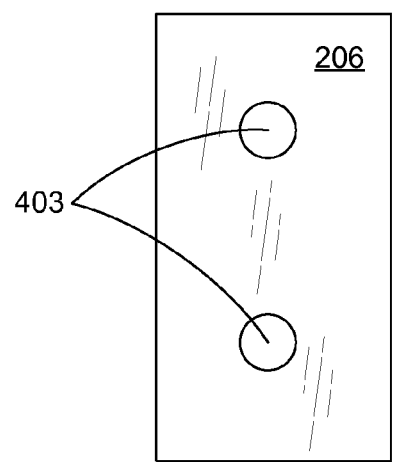
FIG. 4 is a drawing of an example of a spacer of the busbar connection assembly of FIGS. 2A-2B according to various embodiments of the present disclosure.

Turning to FIG. 4, shown is an example of one of the spacers 206 in the busbar connection assembly 200 (FIGS. 2A-2B) according to various embodiments of the present disclosure. The spacer 206 may be rectangular or any other shape. Additionally, at least a portion of the spacer 205 may comprise copper or any other type of material that conducts electricity. According to various embodiments, the spacer 206 may or may not comprise electrically conductive materials. In some embodiments, the spacer 206 may comprise a compressible material, such as rubber, that facilitates the conductive plates 203 (FIGS. 2A-2B) flexing and/or pivoting to clamp to the busbar plates of the power bus 123.

The spacer 206 may also include one or more holes 403 through which the first fasteners 213 (FIGS. 2A-2B) may insert. In addition, the spacer 206 may include one or more holes 403 through which the first fasteners 213 (FIGS. 2A-2B) insert. In embodiments where the spacer 206 comprises a non-conductive material, the spacer 206 may also have conductive portions to facilitate current flowing through the busbar connection assembly 200. For instance, conductive rings may form the holes 403, and a compressible rubber may surround the outer circumference of the conductive rings.

Figure 5A:
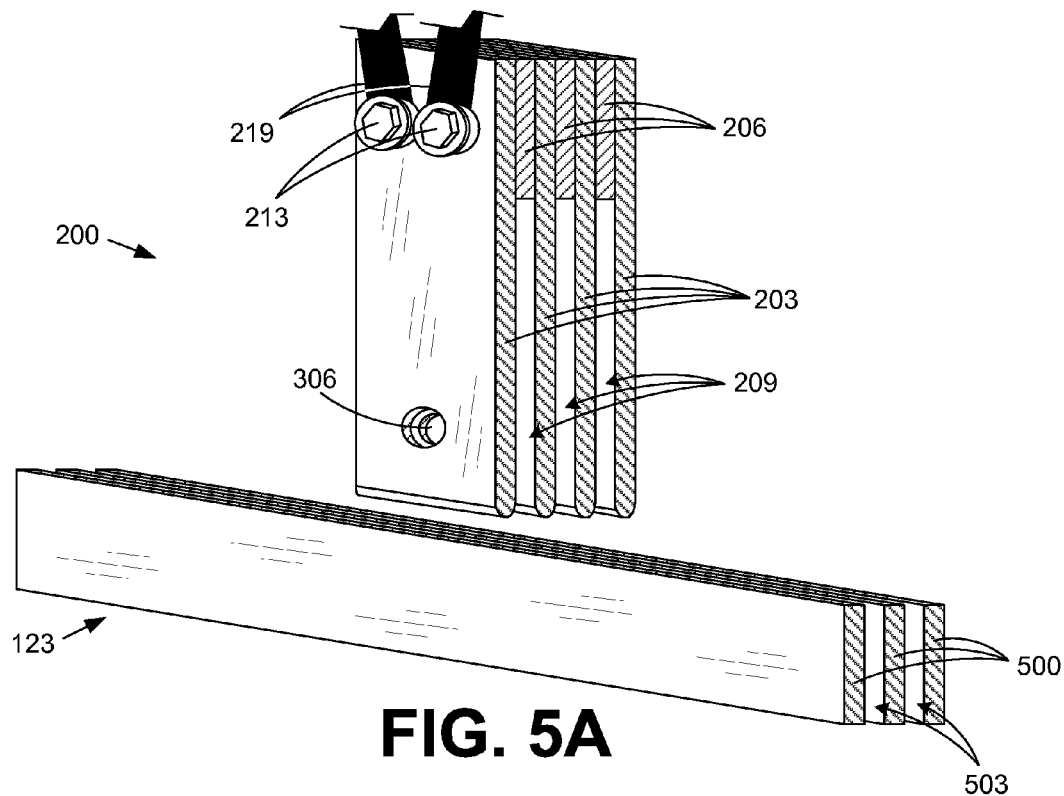
FIGS. 5A-5C are a series of drawings illustrating an example of the busbar connection assembly of FIGS. 2A-2B being attached to a power bus in the datacenter of FIGS. 1A-1B.

With reference now to FIG. 5A, shown is an example of the busbar connection assembly 200 prepared to be attached to a power bus 123. As previously mentioned, the power bus 123 may route power through the datacenter 100 (FIGS. 1A-1B). To this end, the power bus 123 in the present example includes multiple conductive busbar plates 500 that are substantially parallel with respect to each other. In addition, spacings 503 may be located between the busbar plates 500.

As shown, the busbar connection assembly 200 is assembled so that the power cables 219 are electrically connected to the conductive plates 203 and the spacers 206. Additionally, the second fastener 216 (FIGS. 2A-2B) is removed from the busbar connection assembly 200 so that the busbar plates 500 may be inserted into the slots 209 of the busbar connection assembly 200 and so that the conductive plates 203 may be inserted into the spacings 503 between the busbar plates 500. In addition, the busbar connection assembly 200 is oriented so that the slots 209 are aligned with the busbar plates 500 and so that a plurality of the conductive plates 203 are aligned with the spacings 503 between the busbar plates 500.

Figure 5B:
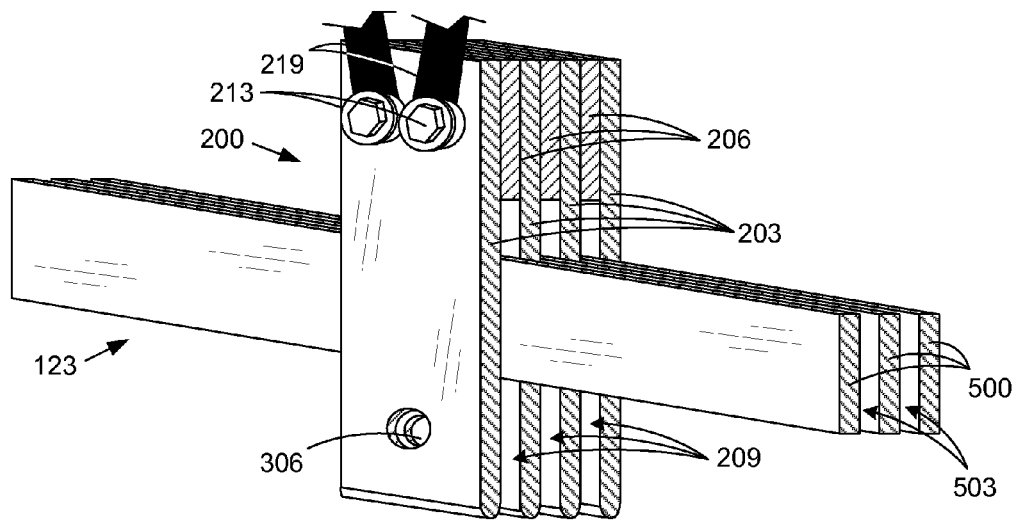

Referring now to FIG. 5B, shown is an example of the busbar connection assembly 200 after a plurality of the busbar plates 500 have been inserted into the slots 209 in the busbar connection assembly 200. As shown, a plurality of the conductive plates 203 have also been simultaneously inserted into the spacing 503 located between the busbar plates 500. In some embodiments, the friction between the conductive plates 203 and the busbar plates 500 may be to the extent that an object, such as a mallet or hammer, may be used to hammer the busbar connection assembly 200 in order for the conductive plates 203 to arrive in the position shown in FIG. 5B with respect to the busbar plates 500.

Figure 5C:
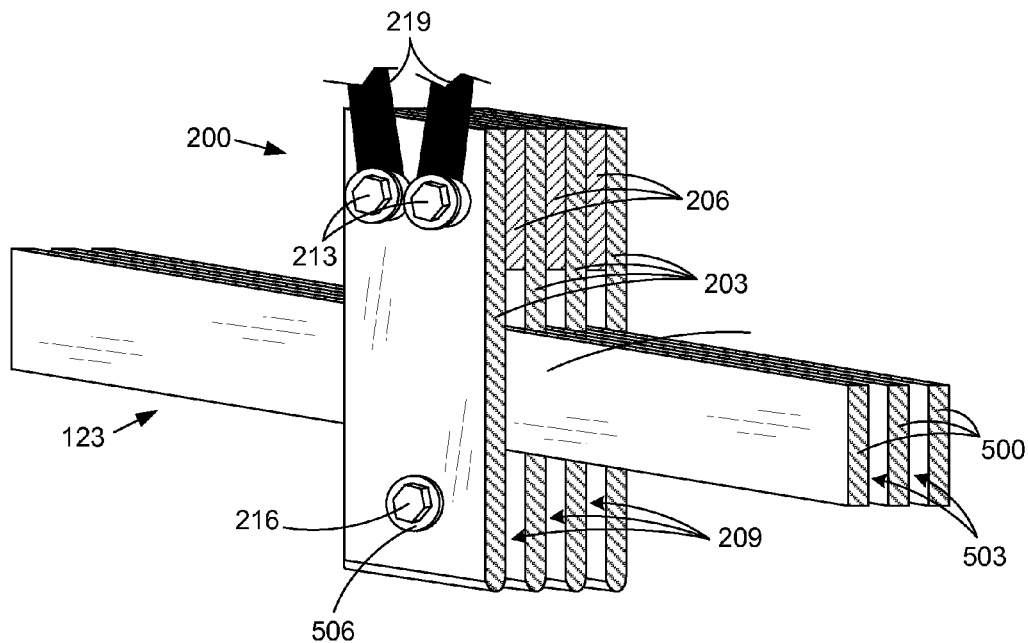

Turning to FIG. 5C, shown is an example of the busbar connection assembly 200 after the second fastener 216 has been inserted into the conductive plates 203 and threaded into the nut 229 (FIG. 2A). As previously mentioned the second hole 309 (FIG. 3) in the conductive plates 203 may be larger than the first holes 306. To prevent the head of the second fastener 216 from sliding all the way through the conductive plates 203, the second fastener 216 may insert into a washer 506 that has an outer diameter greater than the second hole 309, and the washer 506 may be sandwiched between the head of the second fastener 216 and the outermost conductive plate 203. The second fastener 216 may be threaded into the nut 229 and tightened such that the second fastener 216 in conjunction with the nut 226 forces the outermost conductive plates 203 to flex and/or pivot towards the inner conductive plates 203. Thus, the outermost conductive plates 203 can clamp down on and press against one or more of the busbar plates 500 to thereby restrict removal of the busbar connection assembly 200 from the power bus 123.

In the embodiment shown, the busbar plates 500 are located in the slots 209 between the second fastener 216 and the spacers 206. Because the second fastener 216 extends through the conductive plates 203, the second fastener 216 may act as a stop and thereby further prevent removal of the busbar connection assembly 200 from the power bus 123. In order to remove the busbar connection assembly 200, the second fastener 216 may be unscrewed from the nut 229, and the second fastener 216 may be removed from the conductive plates 203. Thereafter, the busbar connection assembly 200 may be pulled away from the power bus 123.

Figure 6:
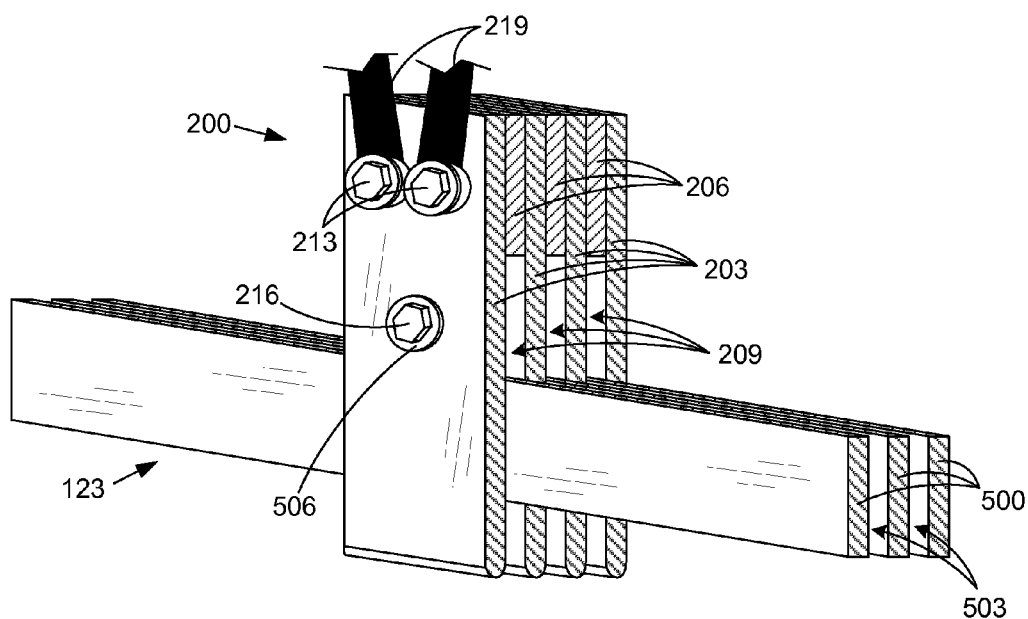
FIG. 6 is a drawing illustrating another example of a busbar connection assembly attached to a power bus in the datacenter of FIGS. 1A-1B according to various embodiments of the present disclosure.

With reference now to FIG. 6, shown is another example of a busbar connection assembly 200 for use in, for example, the datacenter 100 (FIGS. 1A-1B) according to various embodiments of the present disclosure. In particular, shown is an example of the busbar connection assembly 200 after the second fastener 216 has been inserted into the conductive plates 203 and threaded into the nut 229 (FIG. 2A). In the embodiment shown, the second fastener 216 and the second hole 309 (FIG. 3) are located so that when the busbar connection assembly 200 is attached to the power bus 123, the second fastener 216 is located between the busbar plates 500 and the spacers 206. The second fastener 216 and the nut 229 (FIG. 2A) may be tightened, causing the outermost conductive plates 203 to flex and/or pivot about the spacers 206. As a result, the outermost conductive plates 203 may clamp down on and press against the busbar plates 500, thereby restricting removal of the busbar connection assembly 200 from the power bus 123.

In order to remove the busbar connection assembly 200, the second fastener 216 may be loosened or removed. Thereafter, the busbar connection assembly 200 may be forced away from the busbar plates 500.

Figure 7:
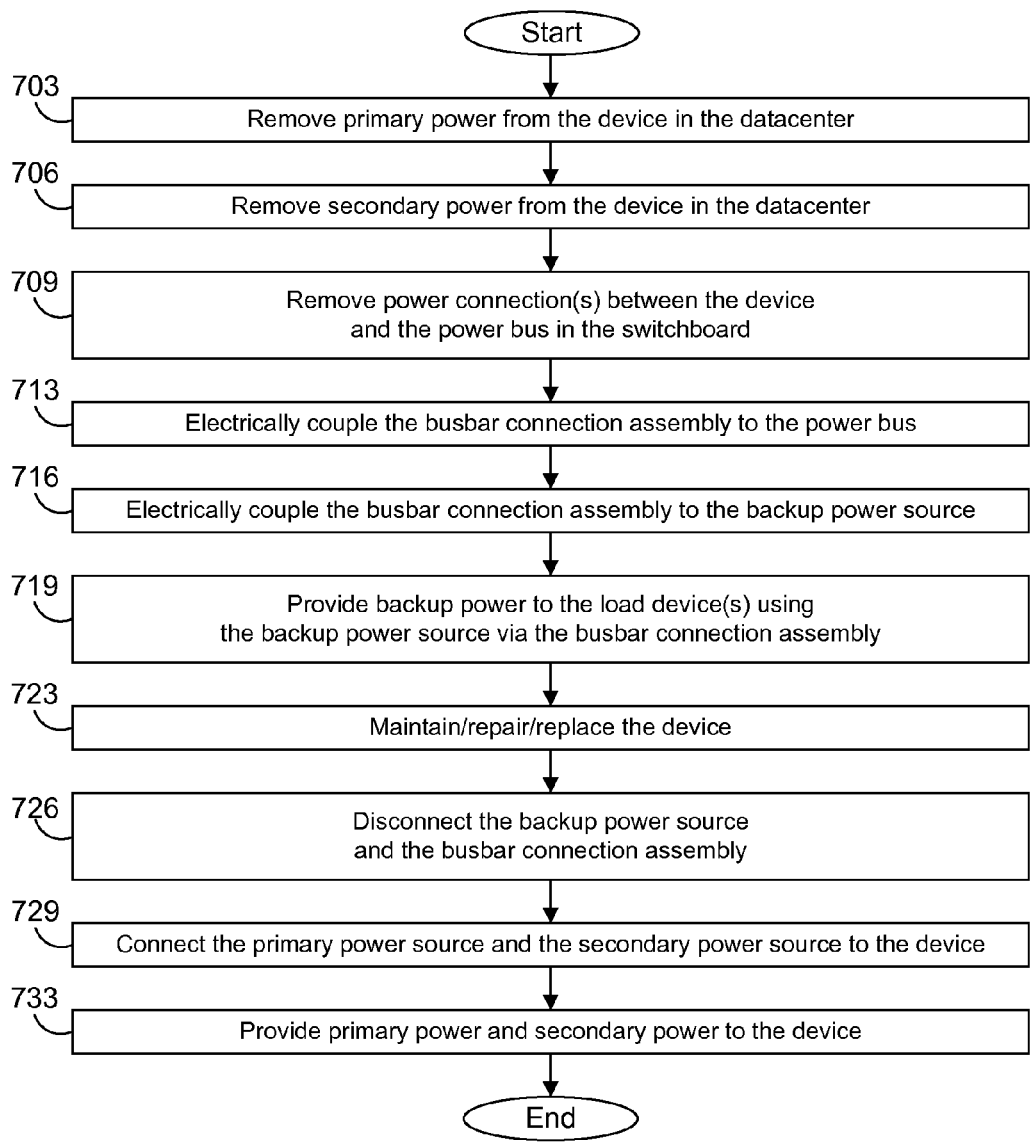
FIG. 7 is a flowchart illustrating an example of an activity performed in the datacenter of FIGS. 1A-1B according to various embodiments of the present disclosure.

Referring now to FIG. 7, shown is a flowchart that illustrates an example of an activity performed in the datacenter 100 (FIGS. 1A-1B) according to various embodiments of the present disclosure. Specifically, the flowchart of FIG. 7 provides an example of a device, such as an automatic transfer switch 109, in the datacenter 100 (FIGS. 1A-1B) being disconnected form the primary power source 103 (FIGS. 1A-1B) and the secondary power source 106 (FIGS. 1A-1B), the busbar connection assembly 200 (FIGS. 2A-2B) being used to provide electrical power to the load devices 119 (FIGS. 1A-1B), and the device being reconnected to the primary power source 103 and the secondary power source 106.

Beginning with box 703, the device in the datacenter 100 is removed from the primary power source 103. The device being removed from the primary power source 103 may be, for example the automatic transfer switch 109 or any other device in the datacenter 100 that is being disconnected from power for various reasons. As shown in box 706, the device is also disconnected from the secondary power source 106. At this time, the battery supply 116 may provide backup power for the load devices 119.

Next, the connections between the device and the power bus 123 (FIGS. 1A-1B) in the switchboard 113 (FIGS. 1A-1B) are removed, as shown in box 709. At this point, the device is electrically isolated from the power sources and the power bus 123.

In box 713, the busbar connection assembly 200 (FIGS. 2A-2B) is electrical coupled to the power bus 123. Coupling the busbar connection assembly 200 to the power bus 123 may involve inserting one or more of the conductive plates 203 (FIGS. 2A-2B) of the busbar connection assembly 200 between the busbar plates 500 (FIGS. 5A-5C) and simultaneously inserting one or more of the busbar plates 500 in the slots 209 (FIG. 2A) in the busbar connection assembly 200.

As shown in box 716, the busbar connection assembly 200 is then electrically coupled to a backup power source. According to various embodiments, the backup power source may be the secondary power source 106, a roll-up generator, or any other type of power source. Additionally, in some embodiments, the primary power source 103 may instead be connected to the busbar connection assembly 200.

In box 719, backup power is then provided to the load devices 119 (FIGS. 1A-1B) using the backup power source via the busbar connection assembly 200. While the load devices 119 are being powered by the backup power source, the powered-down device (e.g., the automatic transfer switch 109) may be maintained, repaired, and/or replaced, as shown in box 723. Additionally, at this time the battery supply 116 may power the load devices 119, so that the datacenter 100 does not lose the computing and/or storage capabilities of the load devices 119.

When the device is ready to be reconnected to the primary power source 103 and/or secondary power source 106, the backup power source may be disconnected from the busbar connection assembly 200, as shown in box 726. For example, one or more power cables 219 (FIGS. 2A-2B) that connect the backup power source and the busbar connection assembly 200 may be disconnected, while the busbar connection assembly 200 remains attached to the power bus 123. In alternative embodiments, the busbar connection assembly 200 may be removed from the power bus 123. For the embodiments in which the busbar connection assembly 200 remains attached to the power bus 123, the busbar connection assembly 200 may serve as a connection point for future usage.

Moving to box 729, the primary power source 103 and the secondary power source 106 are coupled to device. Next, as depicted in box 733, the primary power source 103 and/or the secondary power source 106 provide power to the device, such as the automatic transfer switch 109, which may route the power to the load devices 119. At this time, the battery supply 116 may stop powering the load devices 119 and begin to recharge. Thereafter, the process ends.

The flowchart of FIG. 7 shows an example of activity performed in the datacenter 100. Although the flowchart of FIG. 7 shows a specific order of performance, it is understood that the order of performance may differ from that which is depicted. For example, the order of performance of two or more blocks may be scrambled relative to the order shown. Also, two or more blocks shown in succession in FIG. 7 may be performed concurrently or with partial concurrence. Further, in some embodiments, one or more of the boxes shown in FIG. 7 may be skipped or omitted. It is understood that all such variations are within the scope of the present disclosure.

It is emphasized that the above-described embodiments of the present disclosure are merely possible examples of implementations to set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a datacenter power bus comprising a first busbar conductor and a second busbar conductor, the datacenter power bus being in electrical communication with a computing device; and
a busbar connection assembly attached to the datacenter power bus, wherein the busbar connection assembly provides an electrical coupling between a backup power supply and the datacenter power bus, the busbar connection assembly comprising:
a first conductor;
a second conductor; and
wherein an opening is formed between the first conductor and the second conductor, and wherein at least one of the first busbar conductor or the second busbar conductor is positioned in the opening between the first conductor and the second conductor.

2. The system of claim 1, wherein the first busbar conductor is substantially parallel to the second busbar conductor.

3. The system of claim 1, wherein the first conductor is substantially parallel to the second conductor.

4. The system of claim 1, wherein the busbar connection assembly further comprises a fastener inserted through the first conductor and the second conductor, wherein the fastener restricts a removal of the busbar connection assembly from the datacenter power bus.

5. The system of claim 4, wherein:
the busbar connection assembly further comprises a spacer positioned between the first conductor and the second conductor; and
the first busbar conductor is positioned between the fastener and the spacer.

6. The system of claim 4, wherein:
the busbar connection assembly further comprises a spacer positioned between the first conductor and the second conductor; and
the fastener is positioned between the first busbar conductor and the spacer.

7. The system of claim 1, wherein:
the first conductor further comprises a first tapered edge; and
the second conductor further comprises a second tapered edge.

8. An apparatus, comprising:
a first conductor;
a second conductor, wherein an opening that receives a busbar conductor of a datacenter power bus is formed between the first conductor and the second conductor; and
a power cable electrically coupled to the first conductor and the second conductor.

9. The apparatus of claim 8, wherein the first conductor inserts between the busbar conductor and an additional busbar conductor of the datacenter power bus.

10. The apparatus of claim 9, wherein the first conductor further comprises a tapered edge that facilitates the first conductor being inserted between the busbar conductor and the additional busbar conductor of the datacenter power bus.

11. The apparatus of claim 8, further comprising a conductive spacer located between the first conductor and the second conductor.

12. The apparatus of claim 11, further comprising a fastener that inserts into the first conductor and the second conductor, wherein the busbar conductor is located between the conductive spacer and the fastener.

13. The apparatus of claim 11, further comprising a fastener that inserts into the first conductor and the second conductor, wherein the fastener is located between the busbar conductor and the conductive spacer.

14. The apparatus of claim 8, wherein the first conductor and the second conductor clamp onto the busbar conductor of the datacenter power bus.

15. The apparatus of claim 8, wherein the power cable is electrically coupled to a backup power source of a datacenter.

16. A method, comprising:
   inserting a datacenter busbar conductor into an opening that is formed between a first conductor and a second conductor of a busbar connection assembly;
   restricting the busbar connection assembly from being removed from the opening that is formed between the first conductor and the second conductor; and
   electrically coupling the busbar connection assembly to an electrical power source.

17. The method of claim 16, wherein restricting the removal of the busbar connection assembly comprises inserting a fastener into the first conductor and the second conductor of the busbar connection assembly.

18. The method of claim 16, wherein restricting the removal of the busbar connection assembly comprises clamping the first conductor and the second conductor of the busbar connection assembly onto the datacenter busbar conductor.

19. The method of claim 16, further comprising electrically decoupling the busbar connection assembly from another electrical power source prior to electrically coupling the busbar connection assembly to the electrical power source.

20. The method of claim 16, further comprising electrically decoupling the busbar connection assembly from an automatic transfer switch prior to electrically coupling the busbar connection assembly to the electrical power source.

* * * * *